United States Patent
Mudusuru

(10) Patent No.: US 7,039,733 B2
(45) Date of Patent: May 2, 2006

(54) METHOD, SYSTEM, AND APPARATUS FOR ELIMINATING BUS RENUMBERING IN A COMPUTER SYSTEM

(75) Inventor: Giri P. Mudusuru, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 300 days.

(21) Appl. No.: 10/372,687

(22) Filed: Feb. 21, 2003

(65) Prior Publication Data

US 2004/0168004 A1    Aug. 26, 2004

(51) Int. Cl.
*G06F 13/00* (2006.01)
(52) U.S. Cl. .......................... 710/104; 710/8; 710/300
(58) Field of Classification Search ................ 710/104, 710/8, 300
See application file for complete search history.

(56) References Cited

U.S. PATENT DOCUMENTS 6,397,268 B1 * 5/2002 Cepulis ........................... 710/8
6,892,262 B1 * 5/2005 Taki ............................ 710/300
2003/0182487 A1 * 9/2003 Dennis et al. ............... 710/305
2004/0049618 A1 * 3/2004 Schmisseur et al. ........ 710/104

OTHER PUBLICATIONS

"PCI Bus Numbering In A Microsoft Windows NT Environment," *COMPAQ* Integration Note, Prepared by OS Integration Engineering, Compaq Computer Corporation, Dec. 2000, p. 1-52.

"Intel® E7500 Chipset" Datasheet, Intel® E7500 Memory Controller Hub (MCH), Document No. 290730-001, Feb. 2002, p. 1-154.

* cited by examiner

*Primary Examiner*—Rehana Perveen
*Assistant Examiner*—Christopher A. Daley
(74) *Attorney, Agent, or Firm*—Hope Baldauff Hartman, LLC

(57) ABSTRACT

A method, system, apparatus, and computer-readable medium for eliminating bus renumbering in a computer system are provided. A pool of bus numbers are reserved for each device within a computer system capable of hosting a bridge device. Upon startup of the computer system, each of the buses present in the computer are assigned unique bus numbers. Buses present in the system as a result of a bridge device are allocated bus numbers from the pool of bus numbers reserved for the device upon which the bridge device resides.

20 Claims, 9 Drawing Sheets

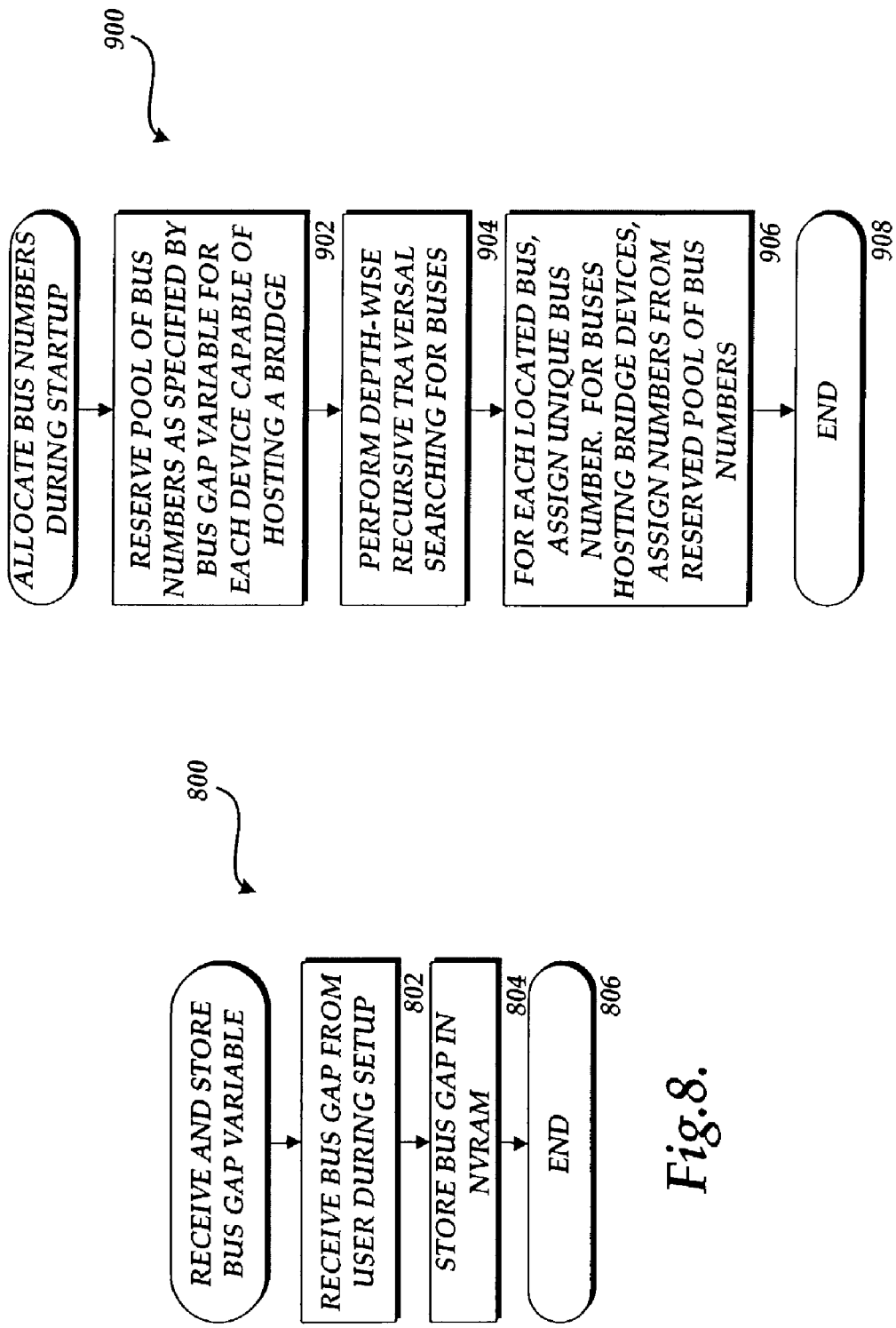

METHOD, SYSTEM, AND APPARATUS FOR ELIMINATING BUS RENUMBERING IN A COMPUTER SYSTEM

TECHNICAL FIELD

The invention relates generally to the field of computer system configuration and, more particularly, to the field of bus numbering within a computer system.

BACKGROUND OF THE INVENTION

Modern computer systems typically include one or more buses for interconnecting system components and for communicating with one or more processors. For instance, many modern desktop and server computer systems utilize the Peripheral Component Interconnect ("PCI") bus architecture standard. Through the PCI buses in a computer system, communication can be made between devices, system memory, and the host processor.

Due to limitations on the number of devices that may be present on a single PCI bus imposed by the PCI bus architecture standard, and for performance-related reasons, most computer systems utilize multiple PCI buses. Buses can be added to an existing bus through the use of special devices called PCI-to-PCI bridges ("PPBs"). PPBs provide connectivity between a primary, or upstream bus, and a secondary, or downstream, bus. Many of today's desktop and server computer systems contain multiple PPBs and, therefore, may have many buses. For instance, several PPBs may be utilized on the system mainboard and additional PPBs may be installed in add-on adapter cards.

In order to access the devices connected to each bus in a computer system, each bus must be given a unique bus number. The PCI basic input/output system ("BIOS") utilized in systems configured according to the PCI bus architecture standard numbers the buses present in a system at startup. The BIOS configures busses present in the system at startup according to the PCI Bus Architecture. By utilizing the numbers assigned by the PCI BIOS, the operating system executing on the computer can identify and communicate with all of the devices within a system, including those located downstream of PPBs.

At startup, the BIOS starts assigning PCI bus numbers starting from Bus 0 because the PCI BIOS is only aware of the existence of PCI Bus 0, the first bus number detected on the primary PCI bus. The PCI BIOS detects any additional buses and assigns numbers to each PCI bus and PPB it detects during system initialization. PCI bus numbers are reassigned by the PCI BIOS each time a system starts and the discovery process begins again.

The bus numbers that the PCI BIOS assigns to each discovered bus are determined by the order of detection. Therefore, when a computer system is modified by adding, removing, or moving an adapter card having one or more bridge devices to a different slot within the computer system, the bus numbers assigned to each bus may change. In fact, because bus numbers are typically assigned sequentially, the bus numbers for all buses discovered after a newly installed device containing a PPB will change.

The renumbering of buses can be problematic in some computer systems in which the operating system does not automatically check for new bus number assignments. If the bindings between a device driver and a renumbered device are not correct, it may appear that the device is not functioning correctly. In some cases, the binding between the driver and the device must be manually reset by a system administrator which can be troublesome. Moreover, the renumbering of buses following a system modification can cause device drivers for renumbered devices in a system to rescan and reconfigure for the newly assigned bus number. This process can be time consuming and slow down the startup of the computer system if many bus numbers have been renumbered.

It is with respect to these considerations and others that the various embodiments of the invention have been made.

SUMMARY OF THE INVENTION

In accordance with the present invention, the above and other problems are solved by a method, system, and apparatus for reducing and, in many cases eliminating, the renumbering of buses that occurs when a configuration change is made in a computer system. By reserving a pool of bus numbers for PCI slots within a computer system capable of hosting bridge devices and numbering actual devices from the pool, the addition, removal, or relocation of adapters containing bridge devices may not result in the buses in the system having to be renumbered.

In accordance with other aspects, the present invention relates to a method for eliminating bus renumbering in a computer system. According to the method, a pool of bus numbers are reserved for each device, such as a PCI slot, within a computer system capable of hosting a bridge device. For instance, if the computer system has a slot that may accept an add-on card including one or more bridge devices, a pool of bus numbers is reserved for the slot, regardless of whether any bridge devices are actually present on the device located in the slot. The number of bus numbers to be reserved in the pool of bus numbers may be user-defined and is referred to herein as a "bus gap," or "bus gap variable."

Upon startup of the computer system, each of the buses present in the computer are assigned unique bus numbers. Buses present in the system as a result of a bridge device are allocated bus numbers from the pool of bus numbers reserved for the device upon which the bridge device resides. In this manner, any number of bridges less than or equal to the bus gap may be added or removed from a device without requiring the renumbering of subsequently discovered buses.

In accordance with still other aspects, the present invention relates to a computer system capable of reducing and, in some cases eliminating, bus renumbering as a result of the removal, addition, or relocation of devices hosting bridges within the computer system. In particular, the computer system includes a processor, a memory, and at least one bus coupled to the processor and memory capable of hosting one or more bridge devices. The system also includes a BIOS capable of being executed on the processor that is operative to receive from a user information, the bus gap, defining the number of bus numbers that should be reserved for each device in the computer system capable of hosting a bridge device. For instance, a user may be permitted to specify that two, three, four, or more bus numbers be reserved for each slot on the computer system capable of receiving an add-on card having bridge devices. The user-provided bus gap is saved by the BIOS in a non-volatile memory.

Upon startup of the computer, the BIOS reserves for each device in the computer system capable of hosting a bridge device a number of bus numbers equal to the bus gap. When the BIOS assigns bus numbers to the each of the buses within the system, the BIOS assigns to each bridge device actually hosted within the computer system bus numbers from the group, or pool, of reserved bus numbers for the device hosting the bridge. In this manner, each device may host any number of bridge devices up to the number identified by the bus gap, without requiring the renumbering of subsequently discovered devices. Moreover, any number of bridge devices can be removed without requiring the renumbering of subsequently discovered devices.

The invention may be implemented as a computer process, a computing system, or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

FIGS. 8–10 illustrate several operational flows utilized by a BIOS for numbering buses within a computer system.

DETAILED DESCRIPTION OF THE INVENTION

Figure 1:
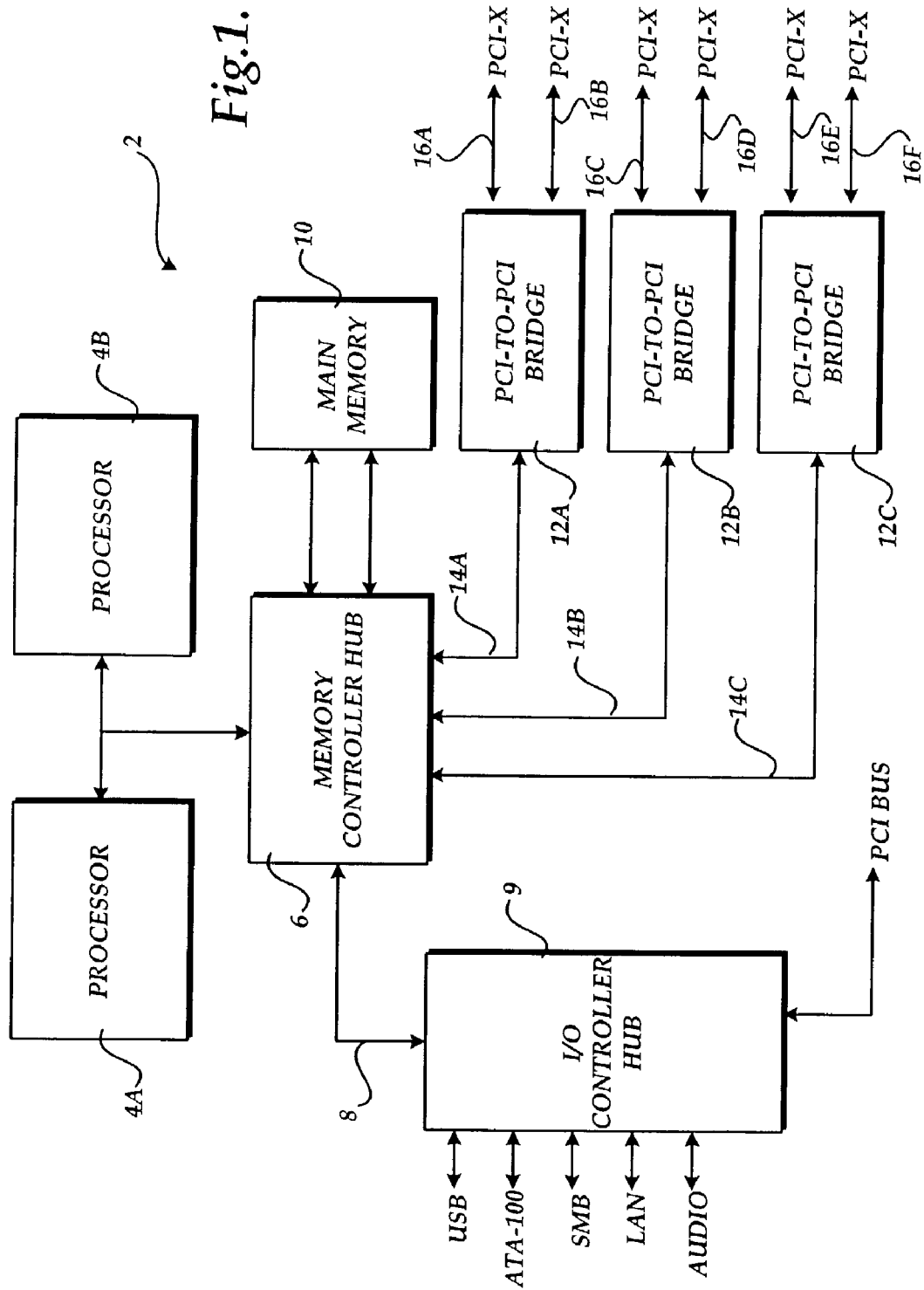
FIG. 1 illustrates a computer architecture utilized in embodiments of the invention which includes multiple bridge devices.

Referring now to the drawings, in which like numerals represent like elements, a computer hardware architecture for a computer utilized in the various embodiments of the invention will be described. In particular, FIGS. 1–3 and the corresponding discussion are intended to provide a brief, general description of a suitable computing environment in which embodiments of the invention may be implemented. While the invention will be described in the general context of program modules that execute as a portion of the operation of a computer BIOS, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computing system 2 utilized in the various embodiments of the invention will be described. The computer architecture shown in FIG. 1 illustrates a conventional desktop or server computer based on the E7500 chipset system architecture from INTEL CORPORATION. The E7500 chipset utilizes three major components: the memory controller hub ("MCH") 6, the input/output controller hub ("ICH") 9, and one or more PPBs 12A–12C.

The MCH 6 provides a hub interface connection 8 for the ICH 9 and three hub interface connections 14A–14C for high speed input/output using the PPBs 12A–12C. The MCH 6 also provides interfaces for communicating with one or more processors 4A–4B, such as the INTEL XEON family of processors. The MCH 6 also provides an interface for communicating with a main memory 10. The ICH 9 is a multi-functional input/output hub that provides a integrated Universal Serial Bus controller ("USB"), an Integrated Drive Electronics ("IDE") controller, a System Management Bus ("SMB) controller, a local area network ("LAN") controller, and audio support.

Each of the PPBs 12A–12C comprises a peripheral chip that performs PCI bridging functions between the MCH 6 hub interfaces 14A–14C and PCI buses 16A–16F. In particular, each PPB 12A–12C interfaces to the MCH 6 via a 16-bit hub interface 14A–14C, respectively. Moreover, each PPB 12A–12C has two independent 64-bit PCI bus interfaces that can be configured to operate in either PCI or PCI-X mode. The PPB 12A provides buses 16A and 16B, the PPB 12B provides buses 16C and 16D, and the PPB 12C provides buses 16E and 16F. In the illustrative embodiment of the invention described herein, each of the PPBs 12A–12C comprises an INTEL P64H2 PCI-to-PCI bridge device.

It should be appreciated that, although the embodiments of the present invention are described in conjunction with the E7500 chipset from INTEL CORPORATION, the invention may be practiced with other types of chipsets and processors from INTEL CORPORATION and from other manufacturers. In particular, the invention as described herein may be practiced with any type of computer system architecture that supports multiple buses and that requires uniquely identifying each of the buses. Nothing herein should be read as limiting the invention as claimed herein to a particular type of computer architecture, chipset, or manufacturer.

Figure 2:
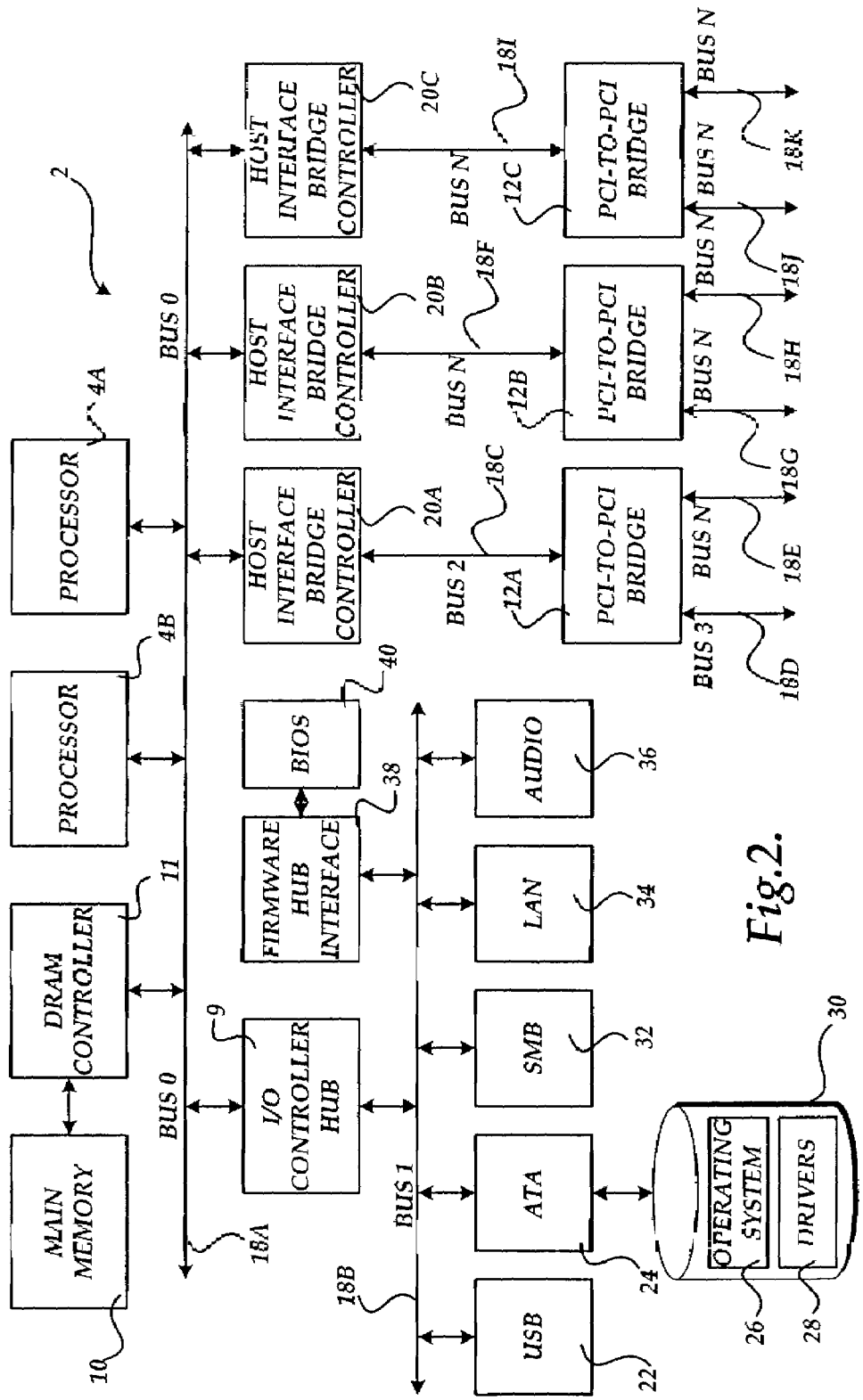
FIG. 2 illustrates a bus tree describing the bus architecture utilized by a computer utilized in embodiments of the invention.

Referring now to FIG. 2, further details regarding the bus architecture and bus numbering for the computer 2 will be described. According to the INTEL E7500 architecture, the MCH 6 uses a host bus 18A for communication with each of the processors 4A–4B, the main memory 10 (through a dynamic random access memory ("DRAM") controller 11), the ICH 9, and one or more host interface bridge controllers 20A–20C. The host bus 18A is the parent bus to all other buses in the computer 2 and is typically numbered as bus zero in the illustrative computer architecture described herein.

As described above, the ICH 9 connects to the host bus 18A and provides a secondary bus 18B. The secondary bus 18B is typically numbered as bus one in the illustrative computer architecture described herein. As illustrated in FIG. 2, the various devices provided by the ICH 9 are attached to the bus 18B. In particular, the USB controller 22, advanced technology attachment ("ATA") controller 24, SMB controller 32, LAN controller 34, and audio controller 36, are connected to the bus 18B. As shown in FIG. 2, the ATA controller 24 may interface with a mass storage device 30 containing an operating system 26 and one or more drivers 28 utilized by the operating system for providing a software interface to hardware devices such as the PPBs 12–12C.

The ICH 9 may also include a firmware hub interface 38 for providing an interface to a BIOS 40. As known to those skilled in the art, the BIOS 40 is the program the computer 2 uses to get the computer system started after it has been powered on. The BIOS 40 also manages data flow between the operating system 26 and attached devices, such as the mass storage device 30. The BIOS 40 is an integral part of the computer 2 and is provided by the manufacturer (in contrast, the operating system 26 may either be preinstalled by the manufacturer or vendor or installed by a user). The BIOS 40 is made accessible to the processor 4A on an erasable programmable read-only memory ("EPROM") chip.

When the computer 2 is powered on, the processor 4A passes control to the BIOS 40, which is always located at the same place on EPROM. When the BIOS 40 boots up the computer, it first determines whether all of the attachments are in place and operational and then it loads the operating system 26 (or key parts of it) into the main memory 10. As will be described in greater detail below, prior to passing control to the operating system 26, the BIOS 40 also identifies each of the buses within the computer 2 and assigns each of the buses a unique identifier, such as a bus number. Additional details regarding the assignment of bus numbers by the BIOS 40 will be provided below.

By utilizing an interface to the BIOS 40, the operating system 26 and applications executing on the operating system 26 are freed from having to understand exact details (such as hardware addresses) about the attached input/output devices. When device details change, only the BIOS 40 needs to be changed. Sometimes this change can be made during system setup, through a setup menu that provides a user interface for allowing a user to modify parameters relating to the operation of the computer 2. Although the BIOS 40 is theoretically always the intermediary between the processors 4A–4B and I/O device control information and data flow, in some cases, the BIOS 40 can arrange for data to flow directly to main memory 10 from devices that require faster data flow to be effective.

Although the description of computer-readable media contained herein refers to a mass storage device 30, such as a hard disk or CD-ROM drive, it should be appreciated by those skilled in the art that computer-readable media can be any available media that can be accessed by the computing system 2. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computing system 2.

As shown in FIG. 2, three host interface bridge controllers 20A–20C are provided by the MCH 6. The host interface bridge controllers 20A–20C provide an interface between the host bus 18A and the PPBs 12A–12C. The bus between the host interface bridge controller 20A and the PPB 12A is typically numbered as bus two in the illustrative computer architecture described herein. As discussed above, each of the PPBs 12A–12B provides two PCI buses. In particular, the PPB 12A provides buses 18D and 18E, the PPB 12B provides buses 18G and 18H, and the PPB 12C provides buses 18J and 18K. The first secondary bus provided by the PPB 12A is typically numbered as bus three in the illustrative computer architecture described herein.

As shown in FIG. 2, the buses within the computer 2 can be thought of as being arranged in a tree hierarchy, or structure. The bus 18A is at the top of the hierarchy. The buses 18B, 18C, 18F, and 18I are at the next level down in the hierarchy. The buses 18D, 18E, 18G, 18H, 18J, and 18K are at the lowest level of the tree. Additional buses added by bridge devices connected to the PPBs 12A–12C would be at an even lower level.

In order to assign bus numbers to each of the buses present in the computer 2, buses are identified by a depth-first recursive traversal of the tree structure. Identified buses are then assigned bus numbers sequentially as they are encountered, beginning with zero. So, as discussed above, the bus 18A is numbered bus zero, the bus 18B is numbered bus one, the bus 18C is numbered bus two, and the first secondary bus 18D on the PPB 12A is numbered as bus three. Additional buses are numbered similarly. If each of the devices shown in FIG. 2 were actually present in a computer system, the bus 18E would be numbered four, the bus 18F would be numbered five, the bus 18G would be numbered six, and so on. However, if any additional PPBs are added to the system, attached for instance to the bus 18D, all subsequently discovered buses would need to be renumbered. The embodiments of the invention described herein for reducing bus renumbering, and potentially eliminating it altogether, are described in greater detail below.

Figure 3:
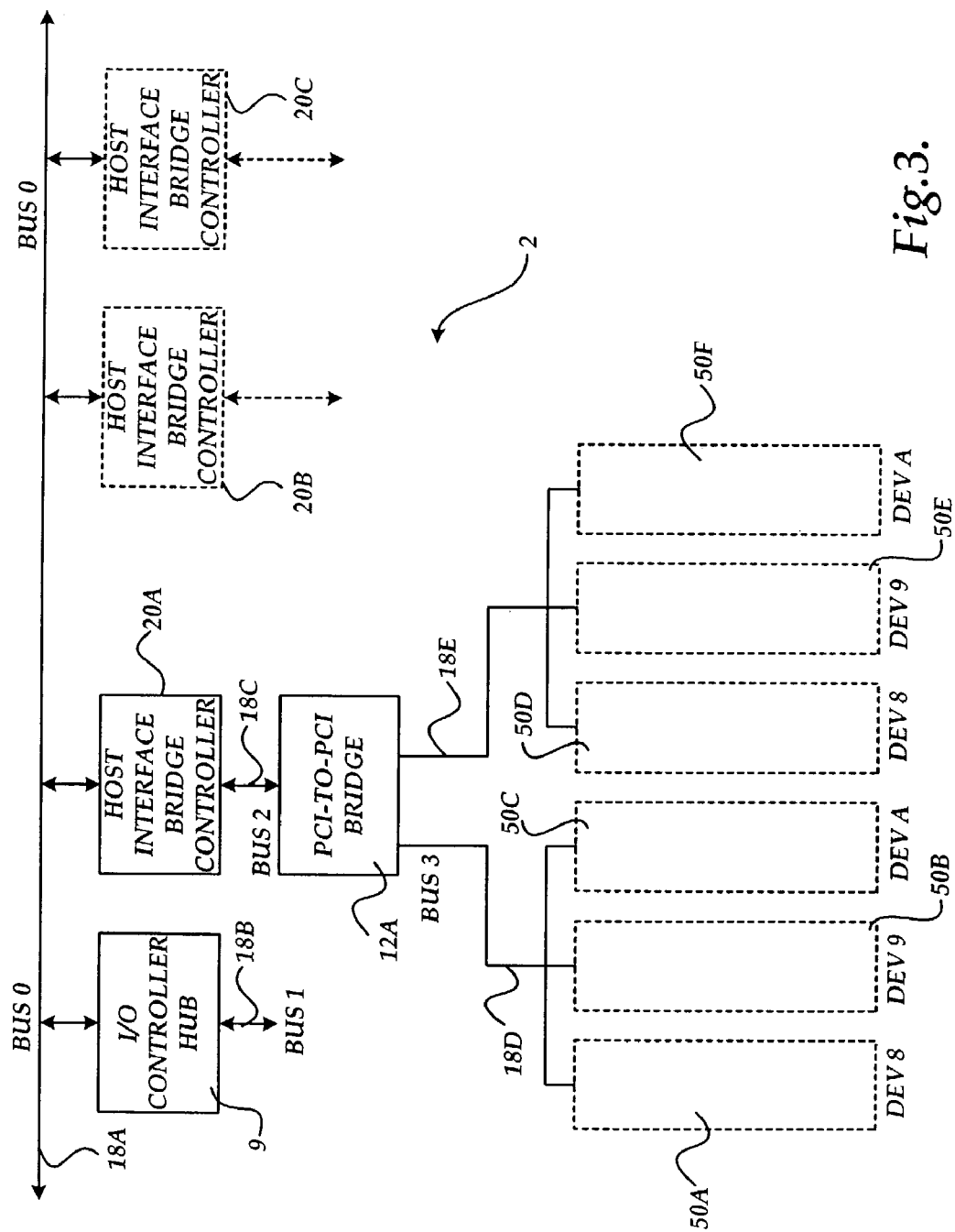
FIG. 3 illustrates how additional buses may be added to a computer architecture utilized in the various embodiments of the invention.

Referring now to FIG. 3, additional details regarding the addition of devices to the computer 2 will be described. As shown in FIG. 3, according to one embodiment of the invention, the host interface bridge controllers 20B–20C may be disabled. The bridge controllers 20B–20C may be disabled in this manner when the system configuration does not require the additional input/output capabilities provided by the bridge controllers 20B–20C.

In the architecture shown in FIG. 3, a single host interface bridge controller 20A is enabled. Additionally, a PPB 12A is connected to the bus 18C. In this architecture, the first secondary bus 18D of the PPB 12A is connected to slots 50A–50C. As known to those skilled in the art, the slots 50A–50C may be provided for expanding the computer 2 through the addition of add-on adapters. It should be appreciated that the bus 18D may support more than three slots. However, in the architecture described herein, the slots 50A–50C are the only slots connected to the bus 18D capable of accepting an add-on card that hosts additional PPBs. In the architecture described herein, the slot 50A is assigned device number 8h (Hexadecimal numbers are referred to herein with a lower-case "h"), slot 50B is assigned device number 9h, and slot 50C is assigned device number Ah.

As shown in FIG. 3, the secondary bus 18E of the PPB 12A is also connected to three slots 50D–50F. As with the bus 18D, the bus 18E is capable of supporting more than three slots. However, for purposes of illustration, only three slots are shown. Moreover, the slots 50D–50F are each capable of supporting devices hosting additional PPBs. As illustrated in FIG. 3, the slot 50D has been assigned device number 8h, the slot 50E has been assigned device number 9h, and the slot 50F has been assigned device number Ah. The computer architecture shown in FIG. 3 utilizing only a single host interface bridge controller 20A and three slots connected to each of the secondary interfaces of the PPB 12A will be utilized below with respect to FIGS. 4–7 to illustrate how the buses are numbered utilizing various bus gap variable settings.

Figure 4:
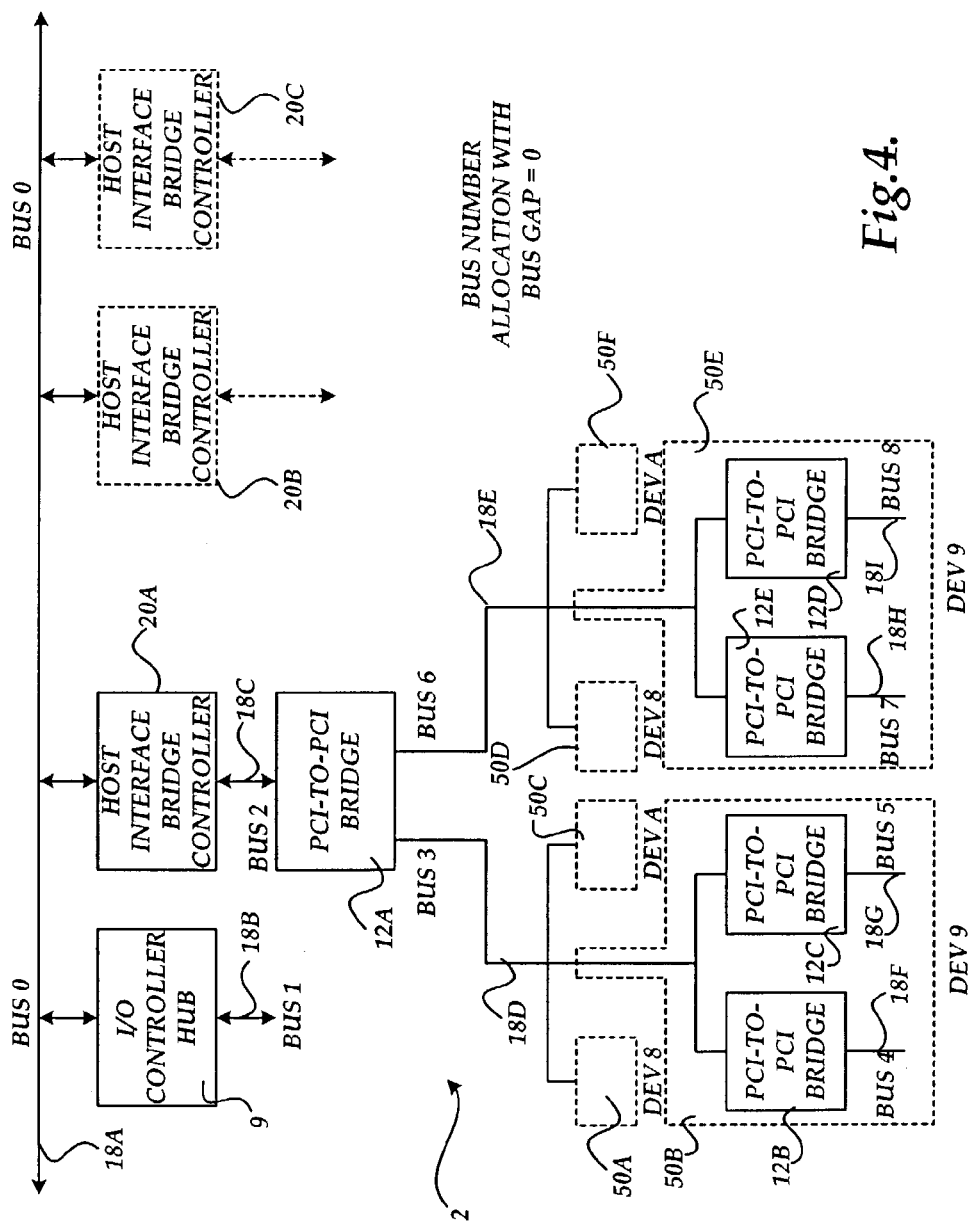
FIG. 4 illustrates how buses in a computer system have traditionally been numbered by prior systems.

Turning now to FIG. 4, an illustrative example of numbering the buses contained in the computer 2 will be described. In FIG. 4, a device has been inserted into the slot 50B that includes two PPBs 12B–12C. Accordingly, two additional device numbers need to be assigned for the devices contained in slot 50B and the buses they provide. Additionally, a device has been inserted into slot 50E which also contains two PPBs 12D–12E. Therefore, an additional two bus numbers need to be assigned for the devices present in slot 50E.

As discussed above, in order to number the buses contained in the computer 2, a depth-first recursive traversal of the bus hierarchy in the computer 2 is performed. Buses are assigned numbers sequentially in the order that they are discovered. With the bus gap variable set to zero as shown in FIG. 4, no additional bus numbers will be reserved. Therefore, when the bus gap variable is set to zero, the buses in the computer 2 are assigned numbers in a conventional manner.

Traversing the buses identified in FIG. 4 in a depth-first manner results in the bus 18F being assigned the number 4h, and the bus 18G being assigned the number 5h. Moreover, the second secondary bus 18E of the PPB 12A is assigned bus number 6h. Then, the PPBs 12D–12E contained on the device inserted into slot 50E are assigned bus numbers 7h and 8h, respectively.

It should be appreciated that when the bus gap variable is set to zero as illustrated in FIG. 4, that slots, such as the slots 50A, 50C, 50D, and 50F, containing no devices have no bus numbers reserved for future expansion. As a result, if a device was placed in slot 50A containing one or more bridges, the buses 18E, 18H, and 18I, would have to be renumbered. As will be described in greater detail below, by reserving bus numbers for each slot 50A–50F, whether or not the slot has a device present with PPBs or not, can reduce and potentially eliminate bus renumbering as result of a configuration change.

Figure 5:
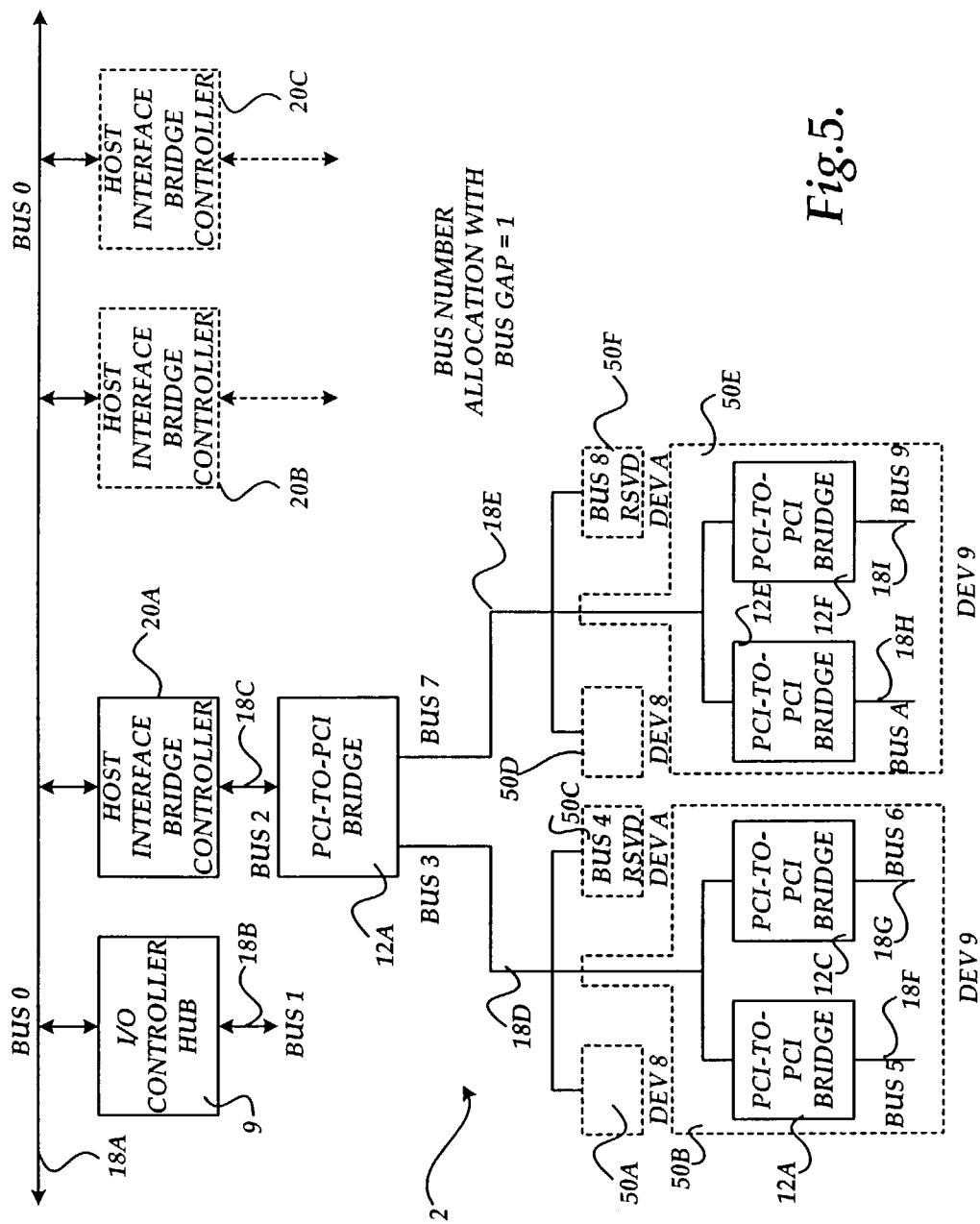
FIGS. 5–7 illustrate how buses are numbered in a computer system according to various embodiments of the invention.

Referring now to FIG. 5, an illustrative example of bus numbering for the buses contained in the computer 2 will be described where the bus gap variable is set to one. As with the illustration show in FIG. 4, the slots 50B and 50E contain devices having two PPBs. Because the bus gap variable has been defined as one, however, a single bus number will be reserved where possible for slots that do not contain any PPBs.

As shown in FIG. 5, the slot 50C does not contain a device. However, according to the bus gap variable, the bus number 4h is reserved for the slot 50C. Moving on to the slot 50B, because two PPBs 12A–12C actually exist in the slot, the bus numbers 5h and 6h are assigned to the buses 18F and 18G. Because the bus 18G has been assigned the bus number 6h, no bus numbers are reserved for the slot 50A.

The bus 18E is assigned bus number 7h and bus number 8h is reserved for slot 50F. The slot 50E contains two PPBs 12E–12F and the buses provided by these PPBs are assigned bus numbers 9h and Ah, respectively. Because the assignment for the slot 50E exceeded the bus gap variable, no bus numbers are reserved for the slot 50D. It should be appreciated from the illustration in FIG. 5, that a single PPB may be added to slot 50C or slot 50F without requiring any renumbering of the buses.

Figure 6:
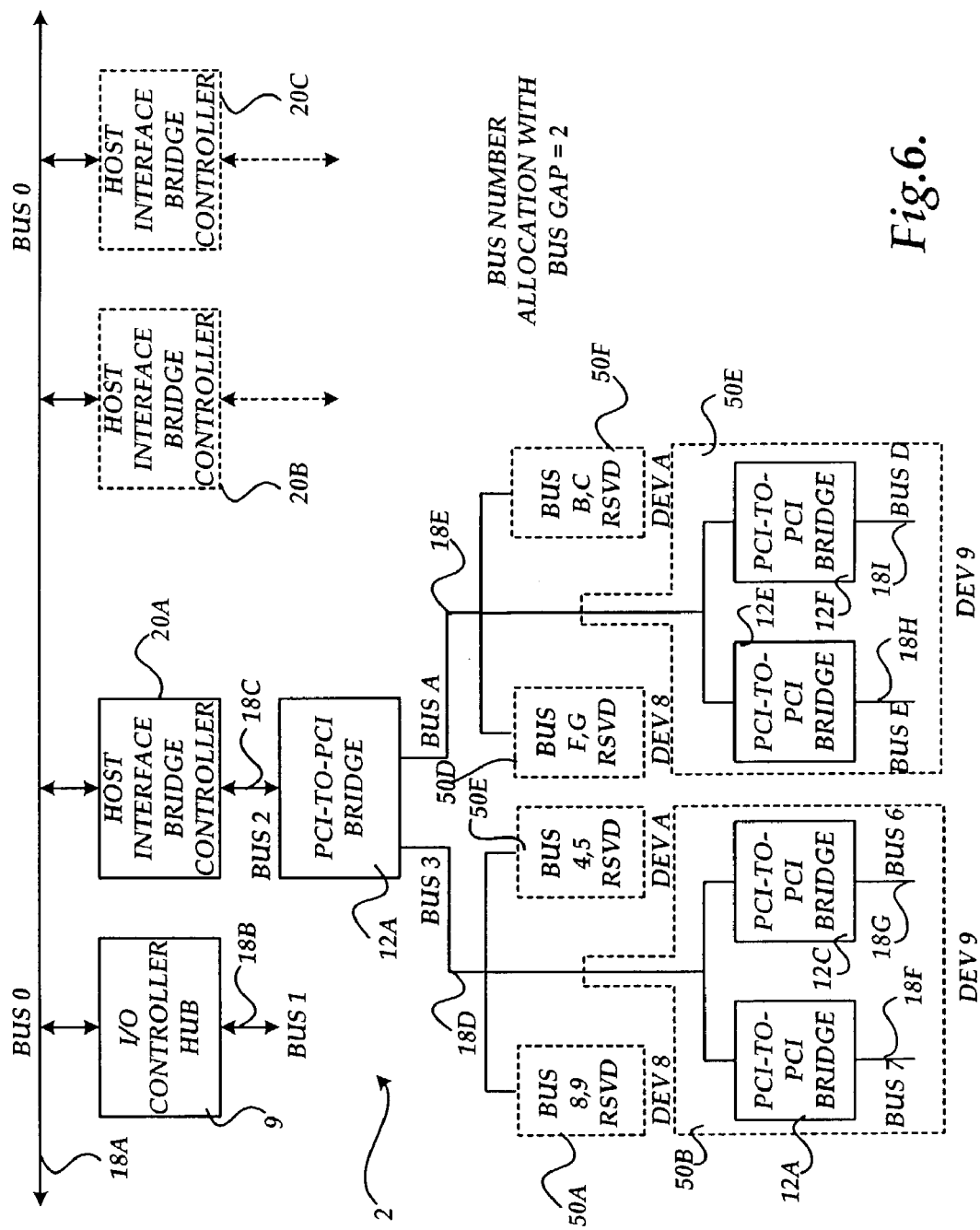

Referring now to FIG. 6, bus numbering within the computer 2 will be illustrated wherein the bus gap variable is set to two. In this example, bus numbers 4h and 5h are reserved for slot 50C. Bus numbers 6h and 7h are assigned to the buses 118F and 18G, respectively. Then, bus numbers 8h and 9h are reserved for the slot 50A.

Bus number Ah is assigned the bus 18E. Bus numbers Bh and Ch are reserved for slot 50C. Bus numbers Dh and Eh are assigned to the buses 18H and 18I, for the device contained in slot 50E. And finally, bus numbers Fh and Gh are reserved for slot number 50D. Based on the illustration in FIG. 6, it should be appreciated that with a bus gap variable set equal to two, up to two PPBs may be installed in slots 50A, 50C, 50D, and 50F, without requiring any renumbering of buses within the computer 2.

Figure 7:
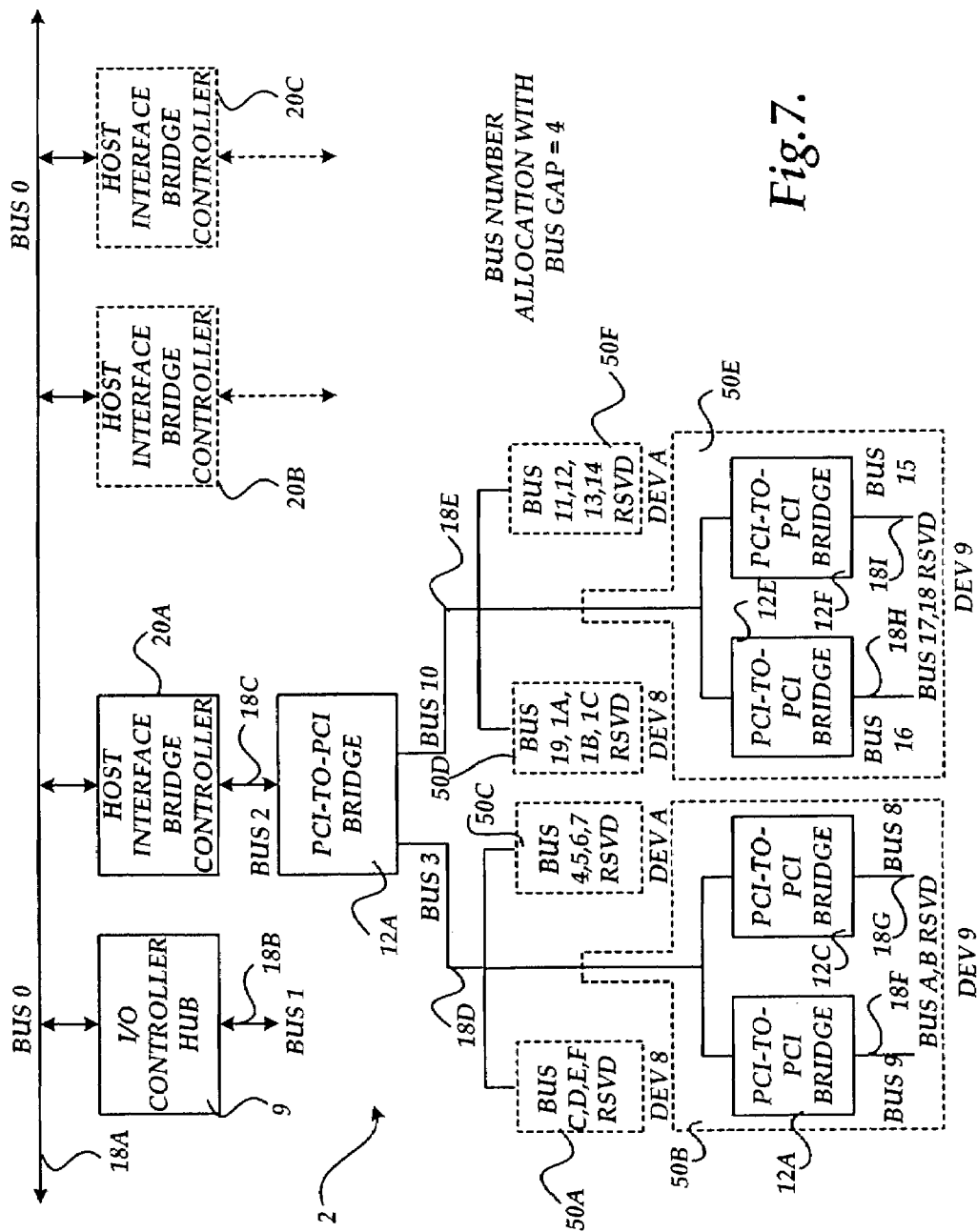

Referring now to FIG. 7, bus numbering within the computer 2 will be illustrated wherein the bus gap variable is set to four. As shown in FIG. 7, when the bus gap variable is set to four, the bus numbers 4h, 5h, 6h, and 7h are reserved for a future device in slot 50C. For slot 50B, bus numbers 8h and 9h are assigned to the buses 18G and 18F, respectively. The bus numbers Ah and Bh are reserved for slot 50B. Then, the bus numbers Ch, Dh, Eh, and Fh are reserved for the slot 50A.

The bus 18E is assigned bus number 10h. Bus numbers 11h, 12h, 13h, and 14h are reserved for the slot 50F. With respect to the slot 50E, buses 18I and 18H are assigned bus numbers 15h and 16h, respectively. The bus number 17h and 18h are reserved for the slot 50E. And finally, the bus numbers 19h, 1Ah, 1Bh, and 1Ch are reserved for the slot 50D.

Based on the illustration in FIG. 7, it should be appreciated that two PPBs may be added to slots 50B and 50E without requiring renumbering. Moreover, it should be appreciated that up to four PPBs may be added to the slots 50A, 50C, 50D, or 50F without requiring any renumbering of buses within the computer 2.

It should be appreciated that FIGS. 4–7 illustrate the numbering of buses within the computer 2 with bus gap variable settings of zero, one, two, and four, respectively. However, there is no limitation on the number of bus numbers that may be reserved for future PPBs within a system as long as the total bus count does not exceed 256 which is limited by the PCI architecture. The illustrations of FIGS. 4–7 are merely for illustrative purposes and are not meant to limit the number of bus numbers that may be reserved for a given device.

The logical operations of the various embodiments of the present invention are implemented as (1) a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims that form a part hereof.

Referring now to FIG. 8, an illustrative routine 800 will be described for receiving and storing a bus gap variable. The routine begins at operative 802, where the bus gap variable is received from a user during setup of the computer 2. As known to those skilled in the art, a BIOS 40 may provide a setup program having a user interface for setting various details and parameters regarding the operation of the computer 2. In one embodiment of the invention, a BIOS 40 is operative to provide a menu wherein a user can set the bus gap variable. The user may also be able to specify whether numbering of buses according to the bus gap variable is turned on or off. Alternatively, the bus gap variable may be hard-coded in the BIOS 40 according to a pre-defined number.

From operation 802, the routine 800 continues to operation 804 where the bus gap is stored in non-volatile random access memory. As known to those skilled in the art, BIOS settings are typically stored in a memory area that is not erased when the computer 2 is turned off. The bus gap variable may be stored in this location so it is available to the BIOS 40 upon every startup of the computer 2. From operation 804, the routine 800 continues to operation 806, where it ends.

Referring now to FIG. 9, an illustrative routine 900 will be described for allocating bus numbers according to a bus gap variable during startup of the computer 2. The routine 900 begins at block 902, where a pool of bus numbers is reserved for each device within the computer 2 capable of hosting a bridge device. The number of bus numbers in the pool is determined by the bus gap variable. By reserving bus numbers for devices whether they are present or not, renumbering of buses in the computer 2 can be reduced and possibly eliminated.

The routine 900 continues from operation 902 to operation 904, where a depth-wise recursive traversal of all of the buses within the computer 2 is performed. During this traversal, the BIOS 40 looks for buses and assigns each bus a unique identifier. Accordingly, at operation 906, the BIOS 40 assigns unique bus numbers to each located bus. For buses hosting bridge devices, the bus numbers assigned by the BIOS 40 are taken from the reserved pool of bus numbers. If the number of bridge devices on the device exceeds the number of reserved bus numbers, additional bus numbers may be utilized. In this case, subsequently discovered devices hosting bridge devices may be unable to allocate bus numbers from their assigned pool. From operation 906, the routine 900 continues to operation 908, where it ends.

Figure 10:
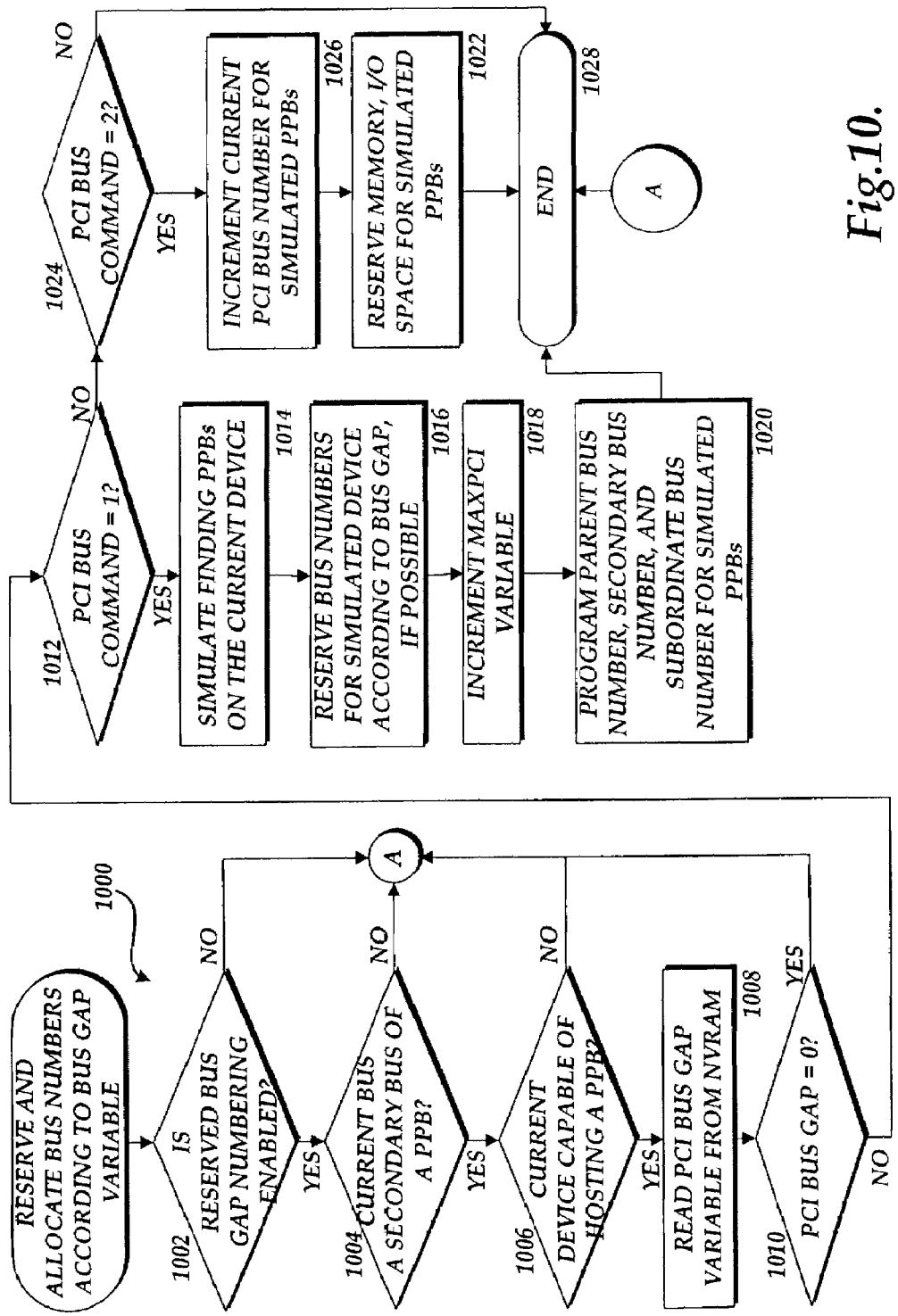

Referring now to FIG. 10, an illustrative routine 1000 will be described that provides additional details regarding the allocation of bus numbers according to the bus gap variable by the BIOS 40. In particular, when bus numbers are assigned to the various buses within a system, the buses are first scanned to identify each of the buses within a system. Each device on each bus is then identified to determine whether it contains buses. Once all the buses on a system have been identified, the bus structure is again traversed and each of the bridge devices is configured.

In particular, memory associated with the bridge device is programmed with a primary bus interface number and a secondary bus interface number. The primary bus interface number identifies the bus nearest the processor and the secondary bus interface identifies the bus farthest away from the processor. A subordinate bus number is also programmed that identifies the highest numbered bus downstream of the bridge device. The routine 1000 illustrates functionality provided during a scan and assignment procedure for buses and devices within a computer system that implements numbering according to the specified bus gap variable.

The routine 1000 begins at decision operation 1002, where a determination is made as to whether reserved bus gap numbering is enabled. If bus gap renumbering is not enabled, the routine 1000 branches to operation 1028. By branching to operation 1028, no numbering of buses according to the bus gap variable will take place. Instead, the buses will be numbered according to a sequential numbering system and no bus numbers will be reserved.

If, at decision operation 1002, it is determined that bus gap numbering is enabled, the routine 1000 continues to decision operation 1004. At decision operation 1004, a determination is made as to whether the current bus is a secondary bus of a PPB. If the current bus is not a secondary bus of a PPB, no variable bus gap numbering is required. Accordingly, if the current bus is not a secondary bus of a PPB, the routine 1000 branches to operation 1028. If, however, the current bus is a secondary bus of a PPB, the routine 1000 continues to operation 1006.

At operation 1006, a determination is made as to whether the current device on the current bus is capable of hosting a PPB. Bus numbers only need to be allocated for those devices, or slots, that are capable of hosting a PPB. Therefore, if the current device on the current bus is not capable of hosting a PPB, the routine 1000 branches from operation 1006 to operation 1028. If, however, the current device on the current bus is capable of hosting a PPB, the routine 100 continues to operation 1008.

At operation 1008, the PCI bus gap variable is retrieved from its storage location in the NVRAM. The routine 1000 then continues to decision operation 1010, where a determination is made as to whether the bus gap variable equals zero. If the bus gap variable equals zero, no bus numbers are reserved and bus numbering takes place in a sequential fashion. Accordingly, if the bus gap variable is equal to zero, the routine 1000 branches to operation 1028. If, however, the bus gap variable is not equal to zero, the routine 1000 continues to decision operation 1012.

At decision operation 1012, a determination is made as to whether the current PCI command is a command for scanning each of the buses within the computer 2 or a command for allocating resources for each of the buses found on a previous scan. Typically, PCI bus command one is assigned to allocating resources scan buses and set each PCI-to-PCI Bridge's (PPBs) Primary, Secondary and subordinate bus number registers to proper values. PCI bus command two is assigned to allocating I/O and memory space needed by all devices and busses that are connected to the bus Therefore, at block 1012, if the PCI bus command equals one, the routine 1000 continues to operation 1014. If the PCI bus command equals two, the routine 1000 branches to decision block 1024. If the bus command is not equal to two at operation 1024, the routine branches to operation 1028. If, however, at operation 1024, the bus command is equal to two, the routine 1000 continues to block 1026.

At block 1026, the current PCI bus number is incremented to reserve space for simulated PPBs. As will be described in greater detail below, in order to reserve bus numbers for non-installed PPBs, these devices are simulated. From operation 1026, the routine 1000 continues to operation 1028.

If, at operation 1012, it is determined that the PCI bus command is equal to one, the routine 1000 continues to operation 1014. At block 1014, the BIOS 40 simulates finding PPBs on the current device. The number of simulated PPBs is equal to the number of bus numbers specified in the bus gap variable minus the number of devices actually installed on the device. The routine 1000 then continues to operation 1016, where bus numbers are reserved for the simulated devices according to the bus gap variable. The routine 1000 then continues to operation 1018, where a MAXPCI variable is incremented to account for the reserved bus numbers. The MAXPCI variable identifies, at any given time during the scanning or assignment of memory to devices on the bus, the maximum number of PCI bus numbers that have been previously assigned.

The routine 1000 then continues to operation 1020, where the parent bus interface number, secondary bus interface number, and subordinate interface bus number are programmed for the simulated PPBs. The routine then continues to block 1022, where memory input/output space is also reserved for the simulated PPBs. By simulating PPBs on devices even though they are not installed, bus numbers can be reserved for devices that are not physically present. The routine 1000 continues to block 1028, where it returns.

If, at operation 1024, it is determined that the PCI bus command equals two, the routine 1000 branches to 1026. At block 1026, the current PCI bus number is incremented to reserve space for simulated PPBs. These devices are simulated. From operation 1026, the routine 1000 continues to operation 1022, where memory and input/output (I/O) space is reserved for the simulated PPBs. The routine 1000 then continues to block 1028, where it returns.

Based on the foregoing, it should be appreciated that the embodiments of the invention provide a method, system, apparatus, and computer-readable medium for eliminating bus renumbering in a computer system. The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for eliminating bus renumbering in a computer system, the method comprising:
   reserving a pool of two or more bus numbers for each device in the computer system capable of hosting a bridge device; and
   assigning bus numbers to actual bridge devices hosted within the computer system from the pool of bus numbers reserved for the device hosting the actual bridge device.

2. The method of claim 1, wherein the number of bus numbers to be reserved in the pool is user-definable and stored in a non-volatile memory of the computer system.

3. A computer-controlled apparatus capable of performing the method of claim 1.

4. A computer-readable medium comprising computer-readable instructions, which, when executed by a computer, cause the computer to perform the method of claim 1.

5. A method for eliminating bus renumbering in a computer system having at least one bus capable of hosting one or more devices, the method comprising:
   defining a bus gap variable that identifies a number of bus numbers two or more that should be reserved for each of the devices that is capable of hosting a bridge device; and
   reserving for each of the devices capable of hosting a bridge device a pool of predefined number of bus numbers, the number of bus numbers reserved in the pool defined by the bus gap variable.

6. The method of claim 5, further comprising:
   determining whether each of the devices capable of hosting a bridge device are actually hosting one or more actual bridge devices; and
   assigning to each of the actual bridge devices, one or more bus numbers from the pool of reserved bus numbers for the device hosting the actual bridge device.

7. A computer-controlled apparatus capable of performing the method of claim 5.

8. A computer-readable medium comprising computer-readable instructions, which, when executed by a computer, cause the computer to perform the method of claim 5.

9. A computer system comprising:
   a processor coupled to a memory;
   at least one bus coupled to the processor and capable of hosting one or more devices; and
   a basic input/output system program capable of being executed on the processor and, when executed on the processor, operative to receive a bus gap variable that identifies a number of bus numbers that should be reserved for each of the devices in the computer capable of hosting a bridge device and, upon startup of the computer, to reserve for each of the devices capable of hosting a bridge device a number of bus numbers defined by the bus gap variable.

10. The computer system of claim 9, wherein the basic input/output program is further operative to determine whether each of the devices capable of hosting a bridge device is actually hosting one or more actual bridge devices, and to assign to each of the actual bridge devices, one or more bus numbers from the bus numbers reserved for the device hosting the actual bridge device.

11. The computer system of claim 10, wherein the basic input/output program is further operative to provide a menu for receiving the bus gap variable and to store the bus gap variable in the memory.

12. The method of claim 2, further comprising detecting the addition of a new bridge device to the computer system, and reassigning bus numbers in response to the addition of the new bridge device only if the number of actual bridges is greater than the number of bus numbers in the pool.

13. The method of claim 12, wherein detecting the addition of the new bridge device comprises detecting the insertion of an add-on card containing the new bridge device into a slot within the computer system.

14. The method of claim 2, further comprising detecting the removal of a bridge device from the computer system, detecting the addition of a new bridge device to the computer system, and allocating one or bus numbers for the new bridge device from the pool if the total number of actual bridge devices within the computer system is less than or equal to the number of bus numbers initially allocated in the pool.

15. The method of claim 6, further comprising detecting the addition of a new bridge device to the computer system, and reassigning bus numbers in response to the addition of the new bridge device only if the number of actual bridges is greater than the number of bus numbers specified in the pool.

16. The method of claim 6, further comprising detecting the removal of a bridge device from the computer system, detecting the addition of a new bridge device to the computer system, and allocating one or more bus numbers for the new bridge device from the pool if the total number of actual bridge devices within the computer system is less than or equal to the number of bus numbers initially allocated to the pool.

17. The method of claim 16, wherein detecting the addition of the new bridge device comprises detecting the insertion of an add-on card containing the new bridge device into a slot within the computer system.

18. The computer system of claim 11 further comprising an operating system, and wherein the operating system is operative to detect the addition of a new bridge device to the computer system, and to reassign bus numbers to the bridge devices in response to the addition of the new bridge device only if the number of actual bridge devices is greater than the number of bus numbers indicated by the bus gap variable.

19. The computer system of claim 11, wherein the operating system is further operative to detect the removal of a bridge device from the computer system, to detect the addition of a new bridge device to the computer system, and to allocate one or bus numbers for the new bridge device if the total number of actual bridge devices within the computer system is less than or equal to the number of bus numbers initially allocated to the bus gap variable.

20. The computer system of claim 11, wherein detecting the addition of the new bridge device comprises detecting the insertion of an add-on card containing the new bridge device into a slot within the computer system.

* * * * *

UNITED STATES PATENT AND TRADEMARK OFFICE
CERTIFICATE OF CORRECTION

PATENT NO. : 7,039,733 B2
APPLICATION NO. : 10/372687
DATED : May 2, 2006
INVENTOR(S) : Giri P. Mudusuru It is certified that error appears in the above-identified patent and that said Letters Patent is hereby corrected as shown below:

Column 12, line 54, should read:
14. The method of claim 2, further comprising detecting the removal of a bridge device from the computer system, detecting the addition of a new bridge device to the computer system, and allocating one or <u>more</u> bus numbers for the new bridge device from the pool if the total number of actual bridge devices within the computer system is less than or equal to the number of bus numbers initially allocated in the pool.

Column 14, line 5, should read:
19. The computer system of claim 11, wherein the operating system is further operative to detect the removal of a bridge device from the computer system, to detect the addition of a new bridge device to the computer system, and to allocate one or <u>more</u> bus numbers for the new bridge device if the total number of actual bridge devices within the computer system is less than or equal to the number of bus numbers initially allocated to the bus gap variable.

Signed and Sealed this

Eighth Day of August, 2006

JON W. DUDAS
*Director of the United States Patent and Trademark Office*